United States Patent
Bender et al.

(10) Patent No.: US 10,742,589 B1
(45) Date of Patent: Aug. 11, 2020

(54) ACCURATELY INDICATING POINT IN TIME OF SOCIAL MEDIA POST USING INTERNET OF THINGS

(71) Applicant: INTERNATIONAL BUSINESS MACHINES CORPORATION, Armonk, NY (US)

(72) Inventors: Michael Bender, Rye Brook, NY (US); Craig M. Trim, Ventura, CA (US); Jeremy R. Fox, Georgetown, TX (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/428,399

(22) Filed: May 31, 2019

(51) Int. Cl.
*G06F 15/173* (2006.01)
*H04L 12/58* (2006.01)
*H04L 29/08* (2006.01)
*G06Q 50/00* (2012.01)

(52) U.S. Cl.
CPC .............. *H04L 51/32* (2013.01); *H04L 51/20* (2013.01); *H04L 67/12* (2013.01); *H04L 67/18* (2013.01); *G06Q 50/01* (2013.01)

(58) Field of Classification Search
CPC ......... H04L 51/32; H04L 51/20; H04L 67/12; H04L 67/18
See application file for complete search history.

(56) References Cited

U.S. PATENT DOCUMENTS

| | | |
|---|---|---|
| 2013/0073568 A1 | 3/2013 | Federov et al. |
| 2013/0073995 A1 | 3/2013 | Piantino et al. |
| 2014/0129559 A1* | 5/2014 | Estes ............... G06Q 10/10 707/737 |
| 2015/0019714 A1* | 1/2015 | Shaashua ............ H04W 4/70 709/224 |
| 2015/0127737 A1* | 5/2015 | Thompson ......... G06F 19/3418 709/204 |
| 2015/0169587 A1 | 6/2015 | Silverman et al. |
| 2015/0264006 A1* | 9/2015 | Parra ................ H04L 51/32 709/206 |

OTHER PUBLICATIONS

Li et al., "Geo-Social Media Analytics," WWW'15 Companion, May 18-22, 2015, p. 1533-1534, ACM, Florence, Italy.
Mell et al., "The NIST Definition of Cloud Computing," National Institute of Standards and Technology, Sep. 2011, p. 1-3, Special Publication 800-145.

* cited by examiner

Primary Examiner — Thanh T Nguyen
(74) Attorney, Agent, or Firm — Jordan T. Schiller (57) ABSTRACT

A computer-implemented method for updating one or more temporal aspects of a social media post. The computer-implemented method captures a geographic location of a first computing device of a first user and a time stamp associated with a social media post of the first user, and posts the geographic location and the time stamp associated with the social media post of the first user. The computer-implemented method further detects one or more additional computing devices of one or more additional users within a defined proximity of the first user, and updates the social media post of the first user with one or more temporal aspects associated with the detected one or more additional computing devices of the one or more additional users.

20 Claims, 5 Drawing Sheets

ACCURATELY INDICATING POINT IN TIME OF SOCIAL MEDIA POST USING INTERNET OF THINGS

BACKGROUND

The present disclosure relates generally to the field of cognitive computing, Internet of Things (IoT), and more particularly to data processing and accurately indicating a point in time of a social media post, for various users, by using internet of things (IoT).

Social media networks allow friends and family to share various kinds of information, both about the poster and those that may be referenced, or tagged, in the social media post. For example, a poster (e.g., user) may post important occasions to their social media network, for example that today is their birthday or wedding anniversary.

In other social media posts, or interactions, a user may post where they are currently eating breakfast, lunch, or dinner, and may even post that they are about to get on an airplane, train, or cruise ship for an exotic destination vacation. Social media contacts, or "friends", of the poster may be able to see other people that are tagged at the breakfast venue, or sitting next to the user on the airplane, although unable to see a time progression of tagged individuals at the social media posting event.

BRIEF SUMMARY

Embodiments of the present invention disclose a method, a computer program product, and a system.

According to an embodiment, a method, in a data processing system including a processor and a memory, for implementing a program that updates one or more temporal aspects of a social media post. The method captures a geographic location of a first computing device of a first user and a time stamp associated with a social media post of the first user, and publishes the geographic location and the time stamp associated with the social media post of the first user. The method further detects one or more additional computing devices of one or more additional users within a defined proximity of the first user, and updates the social media post of the first user with one or more temporal aspects associated with the detected one or more additional computing devices of the one or more additional users.

According to another embodiment, a computer program product for directing a computer processor to implement a program that updates one or more temporal aspects of a social media post. The storage device embodies program code that is executable by a processor of a computer to perform a method. The method captures a geographic location of a first computing device of a first user and a time stamp associated with a social media post of the first user, and publishes the geographic location and the time stamp associated with the social media post of the first user. The method further detects one or more additional computing devices of one or more additional users within a defined proximity of the first user, and updates the social media post of the first user with one or more temporal aspects associated with the detected one or more additional computing devices of the one or more additional users.

According to another embodiment, a system for implementing a program that manages a device, includes one or more computer devices each having one or more processors and one or more tangible storage devices. The one or more storage devices embody a program. The program has a set of program instructions for execution by the one or more processors. The program instructions include instructions for capturing a geographic location of a first computing device of a first user and a time stamp associated with a social media post of the first user, and publishing the geographic location and the time stamp associated with the social media post of the first user. The program instructions further include instructions for detecting one or more additional computing devices of one or more additional users within a defined proximity of the first user, and updating the social media post of the first user with one or more temporal aspects associated with the detected one or more additional computing devices of the one or more additional users.

DETAILED DESCRIPTION

The present invention discloses a method that considers an enhanced user interface that includes a scroll bar associated with a social media post of a poster (e.g., a user), that depicts a time progression related to the shared information of the poster on the social media application. For example, a post may say that 12 people met at a restaurant or 8 people liked a photograph, however there is no timeline associated with when the people arrived at the restaurant or when the posts were liked.

The proposed disclosure captures and utilizes the temporal aspects of social media posts as they relate to the content and the responses of the poster's social media contacts (e.g., friends) and modifies the user interface of a social media post to allow for time filtering, via a scroll bar. In effect, the social media post for an event may not only share information about the event (e.g., location, time, invited guests, etc.) but further provide temporal insights into social media posts leveraging internet of things (IoT) proximity information and interactions with the specific post.

In alternative embodiments, the temporal filtering of a social media post may be extended to include geographic dimensional analysis.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
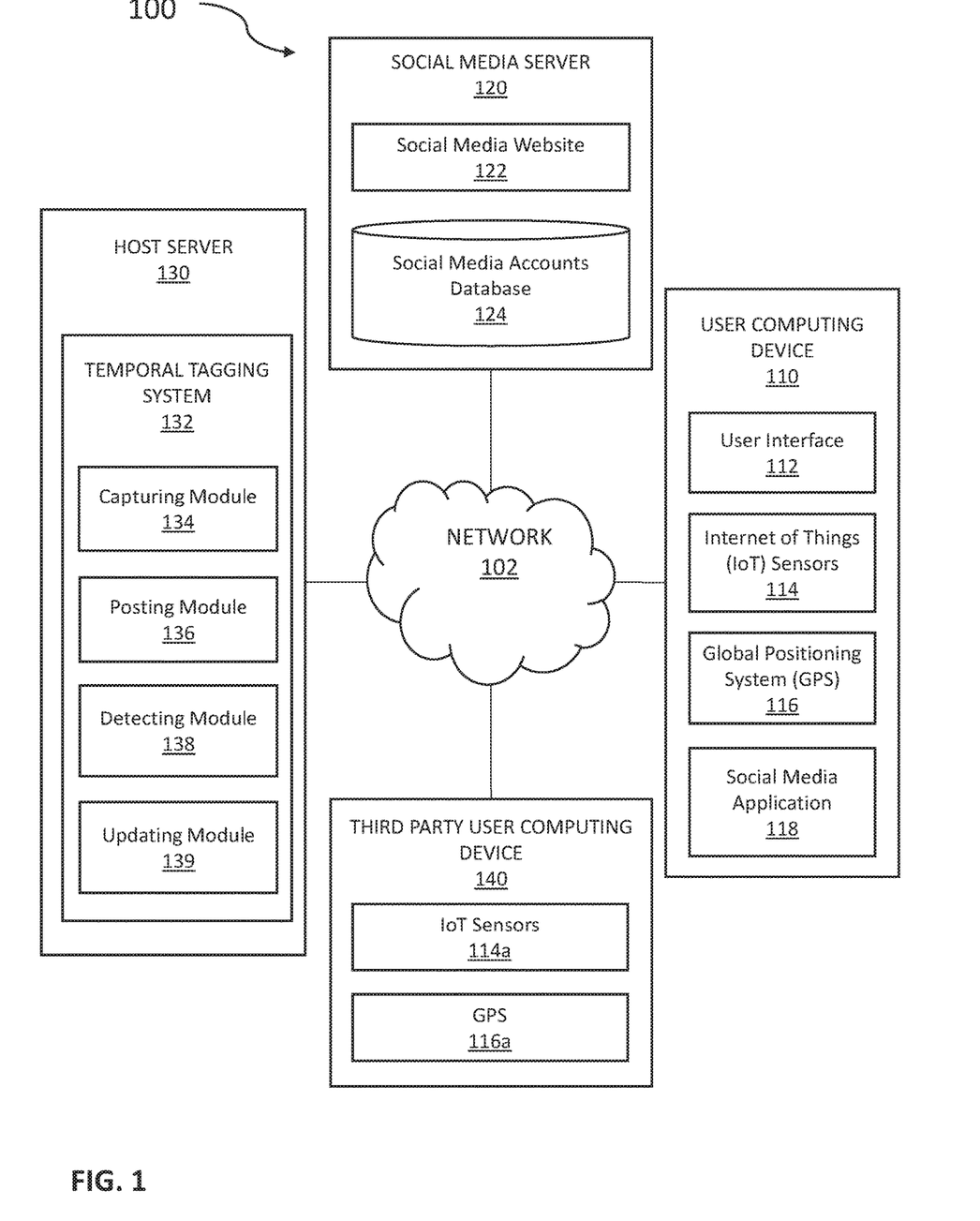
FIG. 1 illustrates temporal tagging computing environment, in accordance with an embodiment of the present invention.

FIG. 1 illustrates temporal tagging computing environment 100, in accordance with an embodiment of the present invention. Temporal tagging computing environment 100 includes user computing device 110, social media server 120, host server 130, and third party user computing device 140, all connected via network 102. The setup in FIG. 1 represents an example embodiment configuration for the present invention, and is not limited to the depicted setup in order to derive benefit from the present invention.

In the example embodiment, user computing device 110 contains user interface 112, internet of things (IoT) sensors 114, global positioning system (GPS) 116, and social media application 118. In various embodiments, user computing device 110 may be a laptop computer, tablet computer, netbook computer, personal computer (PC), a desktop computer, a personal digital assistant (PDA), a smart phone, or any programmable electronic device capable of communicating with social media server 120, host server 130, and third party user computing device 140 via network 102. User computing device 110 may include internal and external hardware components, as depicted and described in further detail below with reference to FIG. 3. In other embodiments, user computing device 110 may be implemented in a cloud computing environment, as described in relation to FIGS. 4 and 5, herein. User computing device 110 may also have wireless connectivity capabilities allowing it to communicate with social media server 120, host server 130, third party user computing device 140, and other computers or servers over network 102.

In an exemplary embodiment, user computing device 110 includes user interface 112, which may be a computer program that allows a user to interact with user computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In an exemplary embodiment, user interface 112 is a web browser, however in other embodiments user interface 112 may be a different program capable of receiving user interaction and communicating with other devices.

In exemplary embodiments, IoT sensors 114 (and 114a) may include embedded computing systems that allow objects, such as third party user computing device 140, to be sensed remotely across existing network infrastructure, such as network 102, thus creating opportunities for more direct integration of the physical world into computer-based systems, and resulting in improved efficiency, accuracy, and economic benefit in addition to reduced human intervention. For example, IoT sensors 114 may be capable of detecting and tracking an authorized computing device of a friend (e.g., third party computing device 140) within a social network, and within a given proximity of user computing device 110.

In various embodiments, IoT sensors 114 are embedded within various devices, such as third party user computing device 140, that contain a computer processing unit (CPU), memory, and power resource, and may be capable of communicating with user computing device 110, social media server 120, and host server 130 over network 102.

In exemplary embodiments, third party user computing device 140 may refer to a wide variety of devices such as a smartphone, a mobile device, a smart watch, wearable devices that are individual-specific (e.g., heart monitoring devices, tailored clothing, hearing aid, etc.), kitchen appliances, or any other type of device that is capable of connecting with user computing device 110 over network 102.

User computing device 110 and third party user computing device 140 can collect useful data, such as location data and timestamp data of social media posts, with the help of various existing technologies (e.g., GPS 116) and then autonomously flow the data between other devices. In this fashion, IoT proximity information between user computing device 110 and third party user computing device 140 can assist in determining temporal changes in a group dynamic related to a social media post.

Device proximity is a known art, and it is known to one of ordinary skill in the art that each and every IoT device can communicate with each other and can identify proximity of the one or more IoT devices within a threshold distance.

In exemplary embodiments, users may configure their mobile or wearable device (e.g., user computing device 110 and third party user computing device 140) regarding what information may be shared/restricted with other IoT computing devices, and may elect to opt-in and opt-out of any information tracking and/or sharing at any time, after being given proper disclosure and consent.

In an exemplary embodiment, GPS 116 (and GPS 116a) is a computer program on user computing device 110 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In an exemplary embodiment, GPS 116 is capable of providing real-time location detection of the user, and hence whether the user has joined a social media posting event (i.e., whether user computing device 110 has come within a threshold proximity of a friend's location).

In exemplary embodiments, social media application 118 may be a web browser, computer application, or other computer program on user computing device 110 that is capable of accessing third party social media website platforms (e.g., social media website 122) for the purpose of viewing, posting, checking-in, attending an online social media event, and so forth. Social media application 118, in exemplary embodiments, is capable of time-stamping a social media post of a user at the time of posting.

Social media application 118, in exemplary embodiments, may also be capable of accessing the location of the user, as well as the location of one or more third party user computing devices' 140 proximity location to user computing device 110. In this fashion, social media application 118 is further capable of time-stamping (dynamically) an arrival time and departure time of a friend at a social media posting event (e.g., a dinner check-in at a particular restaurant via social media application 118).

In exemplary embodiments, users need to register their electronic devices (e.g., user computing device 110, third party user computing device 140, etc.) to their social media accounts and enable sharing of data with their social media contacts (e.g., friends, family) prior to proximity location tracking and information sharing going into effect. The user may opt-in (or out) of proximity location tracking and information sharing of data at any time.

For example, social media application 118 on user computing device 110 can track a user's contacts' (i.e., friends) locations to determine if one or more contacts are within a threshold proximity to the user, whether they are involved in another activity, etc. In various instances, pre-registration of a social media event by a user may minimize polling/tracking of contacts.

In exemplary embodiments, the start time and end time of proximity information (or involvement in other activities) for a user's contacts is tracked and automatically shared to the social media post of the user, if the contact joins an event of the user. A contact may be deemed to have "joined" an event of the user if the contact is within a threshold proximity of user computing device 110.

For example, social media image and post metadata (e.g., timestamp, geographic location, etc.) can be tracked to enable merging with third party user computing device 140 proximity. In this fashion, contacts who "join" a social media gathering of a user, or comment on a social media post or image of a user can be documented in the order of time they commented on a post, and/or "joined" and "left" an event.

Further, the present disclosure discloses an enhanced user interface to allow for presentation of temporal and geographical subsets of interactions related to the social media post of a user. For example, the user interface of the social media website 122 is extended to include filtering of current data by geography and/or time via a scroll bar. The scroll bar associated with a social media post provides a sequence of commenting/response time, joining and leaving of an event of one or more third party users.

In an exemplary embodiment, social media server 120 includes social media website 122 and social media accounts database 124, and may be a laptop computer, tablet computer, netbook computer, personal computer (PC), a desktop computer, a personal digital assistant (PDA), a smart phone, a server, or any programmable electronic device capable of communicating with user computing device 110, host server 130, and third party user computing device 140 via network 102. While social media server 120 is shown as a single device, in other embodiments, social media server 120 may be comprised of a cluster or plurality of computing devices, working together or working separately.

In an exemplary embodiment, social media website 122 is a website capable of hosting social media content shared between registered users, including user profiles and social media posts. For example, social media website 122 is capable of receiving manually input status updates of a user, location of a user, posted images (i.e., photographs) of a user, natural language comments associated with a posted image, status update, and/or location of a user, streaming/live video, check-ins at restaurant/bar/stadium establishments, and so forth, from a user, which may include a timestamp and geographic location of social media posts.

In exemplary embodiments, social media website 122 is accessed via an internet browser, such as user interface 112 on user computing device 110. In other embodiments, however, social media website 122 may be accessed via other means, or may be a standalone program.

In various embodiments, social media website 122 may be a collection of files, including, but not limited to, for example, HTML files, CSS files, XML files, image files and JavaScript files. Social media website 122 can also include other resources such as audio files and video files. In an exemplary embodiment, social media website 122 may be a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn Corporation), or Instagram® (Instagram is a registered trademark of Instagram, LLC).

In exemplary embodiments, social media accounts database 124 may store user profiles, contacts, posts (e.g., user pictures, videos, status updates, check-ins, and so forth), location history of the user, computing device(s) associated with user account, whether the user has opted in (or out) of computing device proximity tracking, etc. For example, user John Smith may be stored as a data object containing the following information in social media accounts database 124: <Smith, John; 242_friends; device123_proximity_tracking_enabled; share_friends {White,Jack; Green,Pearl; Brown,Abe}>.

In exemplary embodiments, social media accounts database 124 receives input from user computing device 110, social media application 118, and temporal tagging system 132.

In various embodiments, social media accounts database 124 is capable of being stored on temporal tagging system 132, or user computing device 110, as a separate database.

In an exemplary embodiment, host server 130 includes temporal tagging system 132 and may be a laptop computer, tablet computer, netbook computer, personal computer (PC), a desktop computer, a personal digital assistant (PDA), a smart phone, a server, or any programmable electronic device capable of communicating with user computing device 110, social media server 120, and third party user computing device 140 via network 102. While host server 130 is shown as a single device, in other embodiments, host server 130 may be comprised of a cluster or plurality of computing devices, working together or working separately.

In an exemplary embodiment, third party user computing device 140 contains IoT sensors 114a and GPS 116a. In various embodiments, third party user computing device 140 may be a laptop computer, tablet computer, netbook computer, personal computer (PC), a desktop computer, a personal digital assistant (PDA), a smart phone, or any programmable electronic device capable of communicating with user computing device 110, social media server 120, and host server 130 via network 102. Third party user computing device 140 may include internal and external hardware components, as depicted and described in further detail below with reference to FIG. 3. In other embodiments, third party user computing device 140 may be implemented in a cloud computing environment, as described in relation to FIGS. 4 and 5, herein. Third party user computing device 140 may also have wireless connectivity capabilities allowing it to communicate with user computing device 110, social media server 120, and host server 130, and other computers or servers over network 102.

In exemplary embodiments, third party user computing device 140 may be the mobile, or wearable, device of one or more social media contacts (i.e., friends) that have authorized, at a minimum, sharing of geographic location and social media data with the user (e.g., user computing device 110). The advantage of sharing data between social media contacts allows for the user to join social events that have been posted by the user, and further allows for additional social media contacts (i.e., friends) to see who else has joined an event (and what time they joined the event) prior to attending.

With continued reference to FIG. 1, temporal tagging system 132 may be a computer program on host server 130 that contains instruction sets, executable by a processor. The instruction sets may be described using a set of functional modules. Temporal tagging system 132 receives input from user computing device 110, social media server 120, and third party user computing device 140. In alternative embodiments, temporal tagging system 132 may be a computer application on a separate electronic device, such as user computing device 110.

With continued reference to FIG. 1, the functional modules of temporal tagging system 132 include capturing module 134, posting module 136, detecting module 138, and updating module 139.

Figure 2:
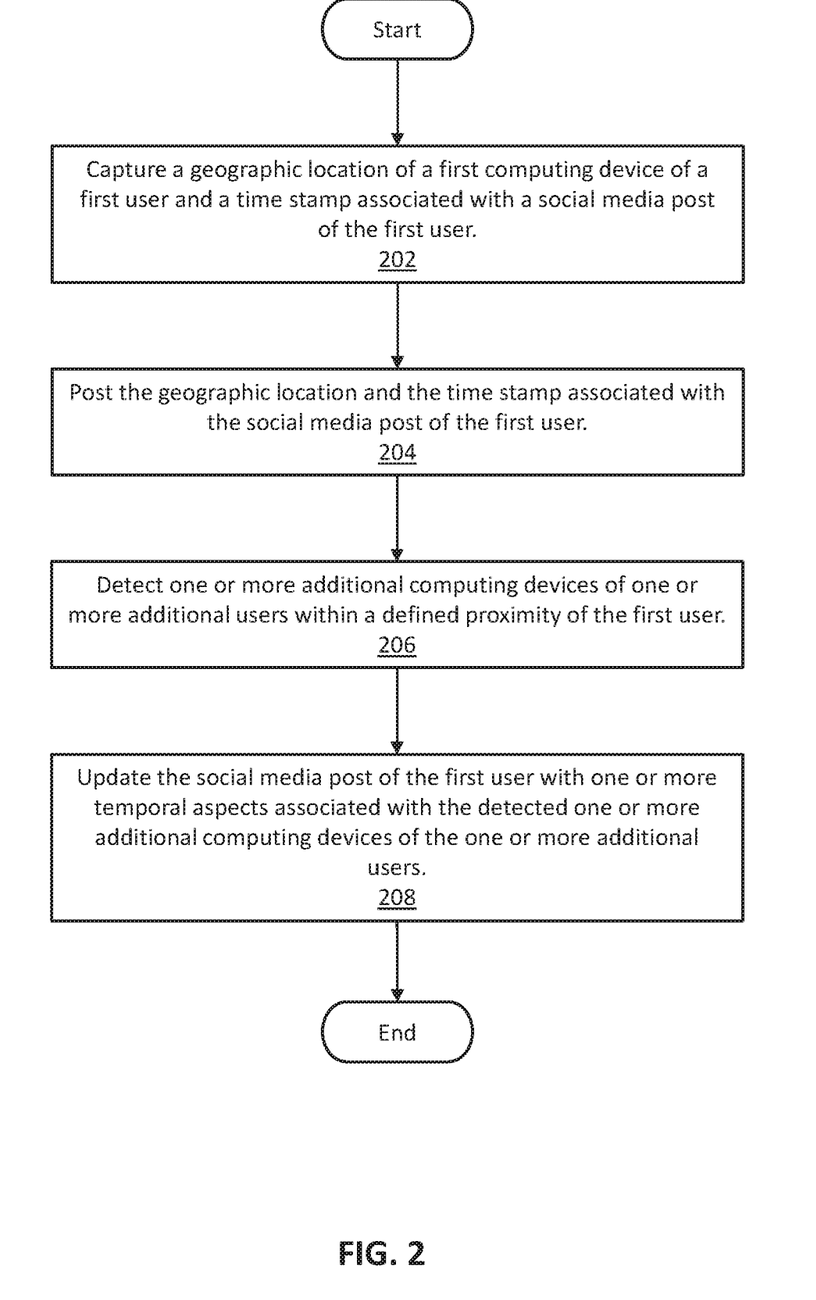
FIG. 2 is a flowchart illustrating the operation of the temporal tagging system of FIG. 1, in accordance with an embodiment of the present invention.

FIG. 2 is a flowchart illustrating the operation of temporal tagging system 132 of FIG. 1, in accordance with embodiments of the present invention.

With reference to FIGS. 1 and 2, capturing module 134 includes a set of programming instructions, in temporal tagging system 132, to capture a geographic location of a first computing device of a first user (e.g., user computing device 110) and a time stamp associated with a social media post of the first user (step 202). The set of programming instructions is executable by a processor.

In exemplary embodiments, capturing module 134 may capture (i.e., receive) the geographic location of the first user via GPS 116 on user computing device 110, or by any other means known to one of ordinary skill in the art.

In exemplary embodiments, capturing module 134 may capture (i.e., receive) the time stamp associated with a social media post of the first user on social media application 118.

In exemplary embodiments, the social media post of the first user includes at least one of the following: an image, a photo, a video, a text posting, an event, and a location.

With reference to an illustrative example, Sarah created a scheduled family and friends dinner on social media application 118 and shared the same with her social network. Sarah invited 5 family members and opened up the dinner to any friends who are nearby and want to join. On the scheduled date of the event, capturing module 134 captures Sarah's arrival at the scheduled venue of the event, Restaurant ABC.

With continued reference to FIGS. 1 and 2, posting module 136 includes a set of programming instructions in temporal tagging system 132, to post the geographic location and the time stamp associated with the social media post of the first user (step 204). The set of programming instructions is executable by a processor.

With continued reference to the illustrative example above, posting module 136 automatically shares the location and time of Sarah's arrival at Restaurant ABC (e.g., 567 3$^{rd}$ Avenue in Manhattan, at 6 pm on Apr. 28, 2019).

With continued reference to FIGS. 1 and 2, detecting module 138 includes a set of programming instructions in temporal tagging system 132, to detect one or more additional computing devices of one or more additional users within a defined proximity of the first user (step 206). The set of programming instructions is executable by a processor.

In exemplary embodiments, temporal tagging system 132 further includes utilizing IoT proximity information and interactions between the computing device of the first user (e.g., user computing device 110) and the detected one or more additional computing devices of the one or more additional users (e.g., third party user computing device 140) to post, within the social media post of the first user, location and time references.

With continued reference to the illustrative example above, Sarah's select friends and family on social media application 118 have opted-in to allow their third party user computing devices 140 to share location information with Sarah (and vice versa), and therefore are able to see when Sarah arrived at the restaurant. After the event is started, Sarah's friends and family start to join gradually. Detecting module 138 detects via IoT sensors 114 that Joan (i.e., Joan's third party user computing device 140), one of Sarah's social media contacts, is within a proximity of Restaurant ABC. Joan may receive an alert on her mobile device notifying her that her friend Sarah is nearby having dinner and that the dinner event is open to any friends in the vicinity. Joan uses the enhanced scroll bar interface on social media application 118 to see if she knows anyone else at the dinner. Joan sees that her friend Rebecca joined the event at 6:35 pm, only 5 minutes ago. Joan decides to walk to Restaurant ABC to join the event.

With continued reference to FIGS. 1 and 2, updating module 139 includes a set of programming instructions in temporal tagging system 132, to update the social media post of the first user with one or more temporal aspects associated with the detected one or more additional computing devices of the one or more additional users (step 208). The set of programming instructions is executable by a processor.

In exemplary embodiments, the one or more temporal aspects include at least one of the following: the time stamp of when the one or more additional computing devices of the one or more additional users joined the first user; the time stamp of when the one or more additional computing devices of the one or more additional users left the first user; the geographic location of when the one or more additional computing devices of the one or more additional users joined the first user; and the geographic location of when the one or more additional computing devices of the one or more additional users left the first user.

In exemplary embodiments, updating the social media post of the first user with one or more temporal aspects associated with the detected one or more additional computing devices of the one or more additional users includes tagging, automatically, the social media post of the first user with names of the one or more additional users that joined the first user and the one or more additional users that left the first user.

In further exemplary embodiments, updating the social media post of the first user further includes posting, within the social media post of the first user, the tagged names of the one or more additional users that joined the first user and the one or more additional users that left the first user via a scroll bar.

In exemplary embodiments, the scroll bar includes point in time information of the one or more additional users that joined the first user and the one or more additional users that left the first user.

With continued reference to the illustrative example above, Joan arrives at Restaurant ABC at 6:45 pm. Updating module 139 automatically updates Sarah's social media event posting to reflect Joan's arrival, together with the time of her arrival, by tagging Joan's arrival in Sarah's social media event. Other contacts in Sarah's social media contacts are able to view the social media event posting, together with engaged participants, on social media application 118 using the enhanced scroll bar for the social media event. The joining and leaving of Sarah's friends are depicted in the scroll bar, so the user can view point in time information, for example who joined the dinner in the first 30 minutes after the start of the event, and so forth.

In exemplary embodiments, a user can use the scroll bar to change the view of the point-in-time information associated with the social media post. At the same time, the gradually updated information about the social media posting event can be shown graphically, for example an electronic map or a time scale.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between user computing device 110, social media server 120, host server 130, and third party user computing device 140.

Figure 3:
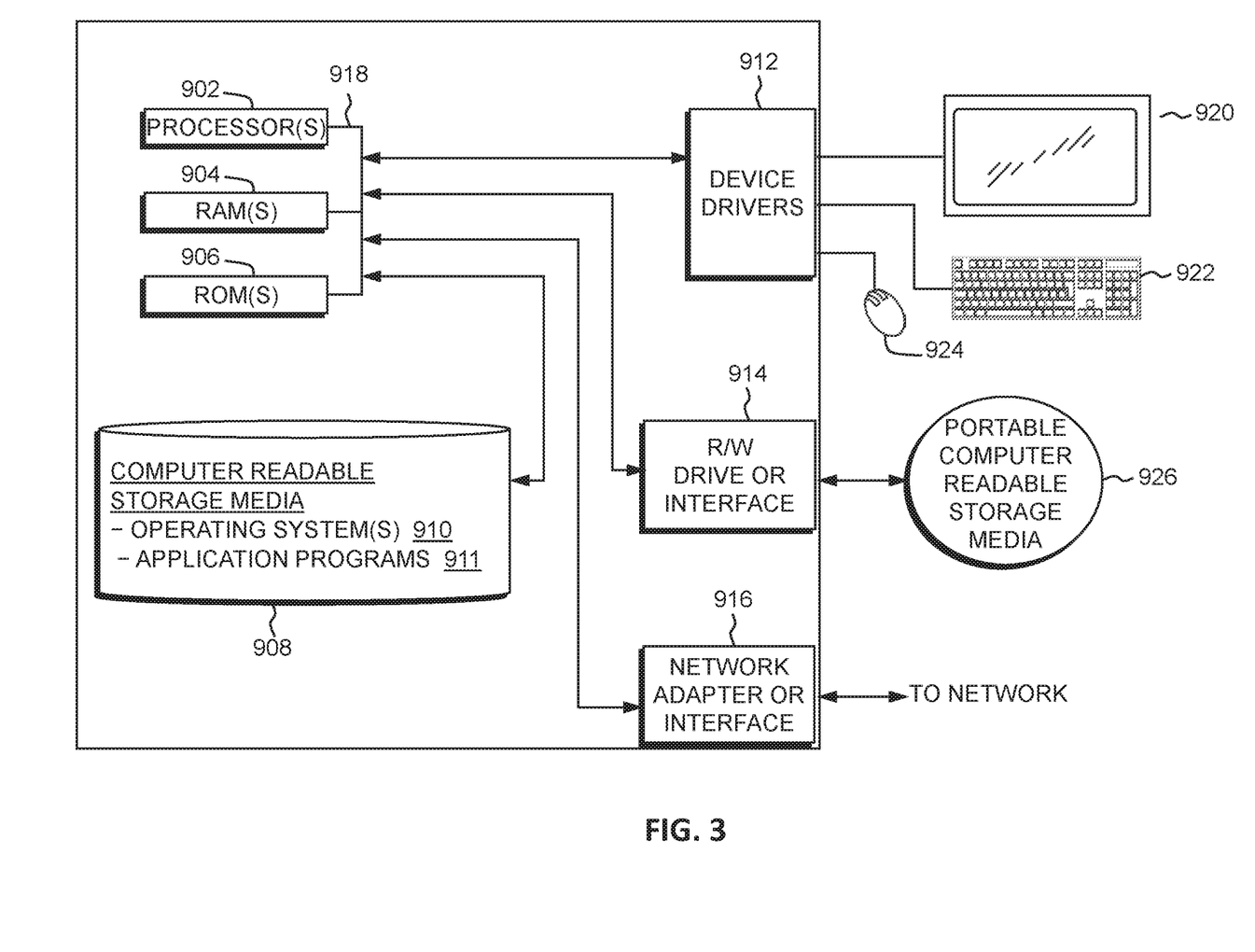
FIG. 3 is a diagram graphically illustrating the hardware components of a computing environment of FIG. 1, in accordance with an embodiment of the present invention.

FIG. 3 is a block diagram depicting components of a computing device (such as user computing device 110, social media server 120, host server 130, and third party user computing device 140, as shown in FIG. 1), in accordance with embodiments of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as temporal tagging system 132, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on the computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on the computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
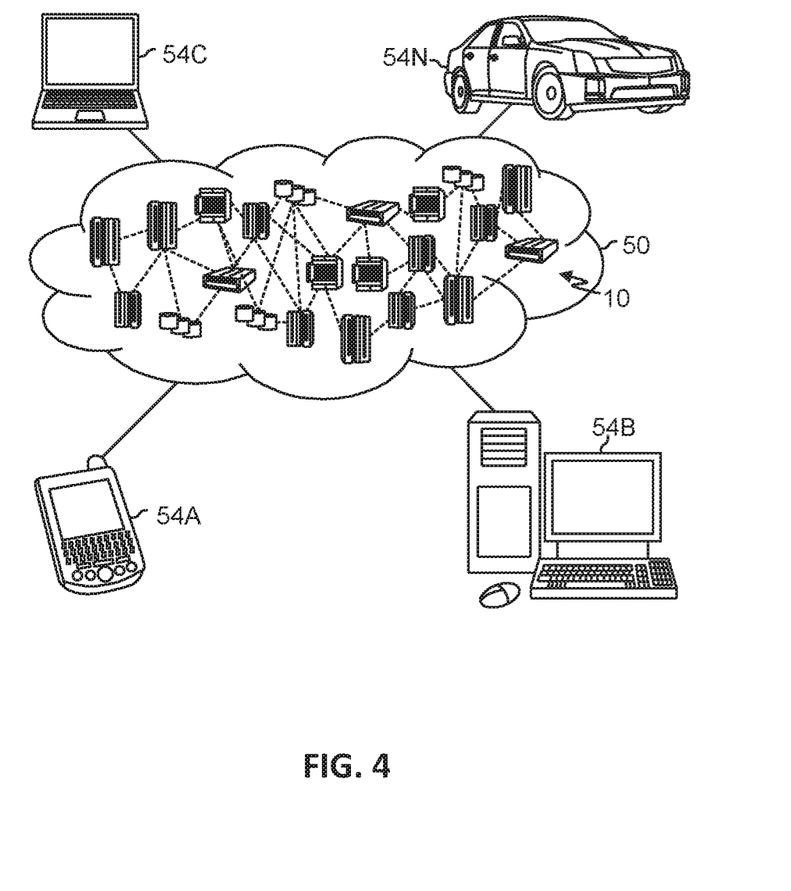
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
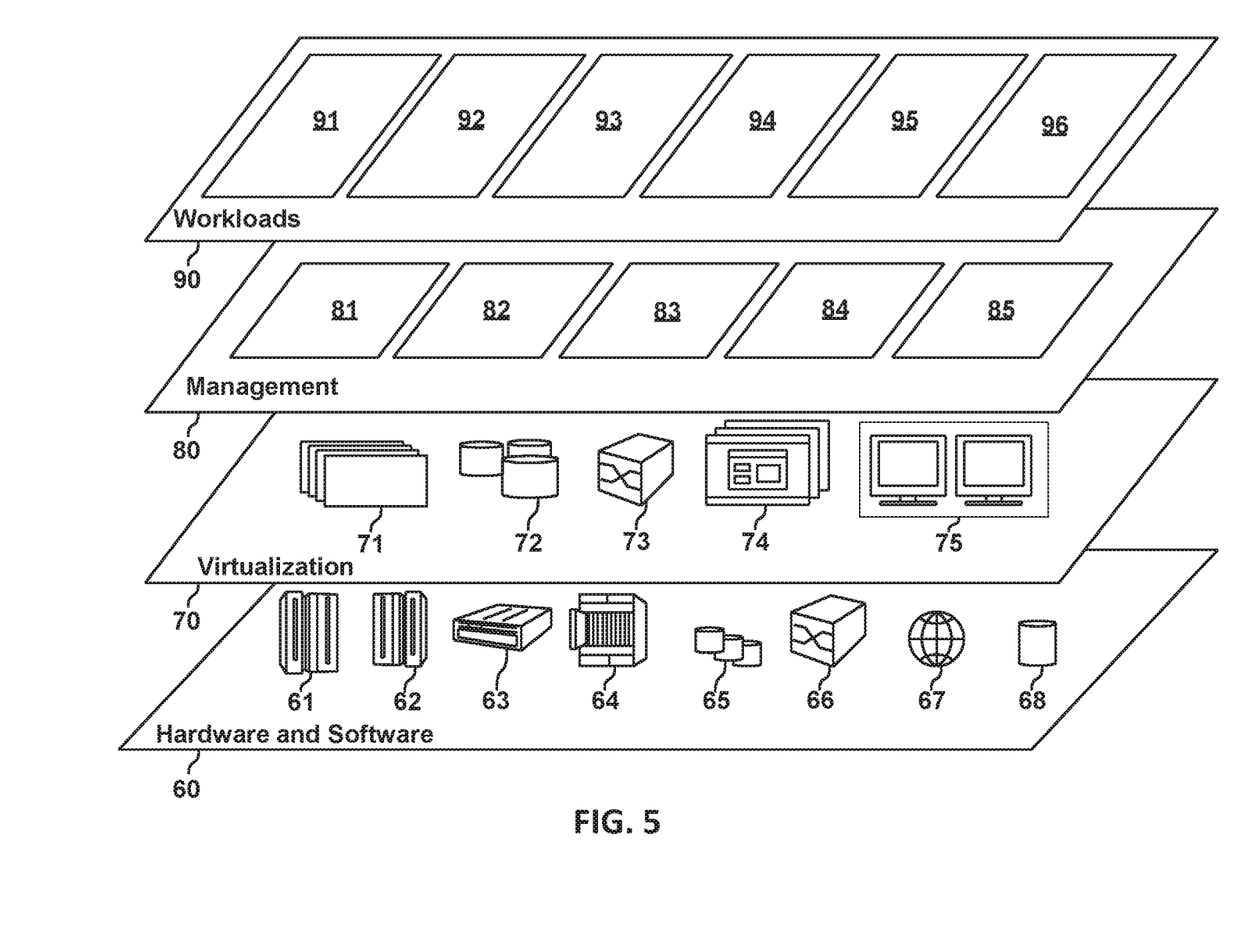
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer implemented method for updating one or more temporal aspects of a social media post, comprising:

capturing a geographic location of a first computing device of a first user and a time stamp associated with a social media post of the first user;
posting the geographic location and the time stamp associated with the social media post of the first user;
detecting one or more additional computing devices of one or more additional users within a defined proximity of the first user;
updating the social media post of the first user with one or more temporal aspects associated with the detected one or more additional computing devices of the one or more additional users.

2. The computer implemented method of claim 1, wherein the one or more temporal aspects comprise at least one of the following: the time stamp of when the one or more additional computing devices of the one or more additional users joined the first user; the time stamp of when the one or more additional computing devices of the one or more additional users left the first user; the geographic location of when the one or more additional computing devices of the one or more additional users joined the first user; and the geographic location of when the one or more additional computing devices of the one or more additional users left the first user.

3. The computer implemented method of claim 2, wherein updating the social media post of the first user with one or more temporal aspects associated with the detected one or more additional computing devices of the one or more additional users, comprises:
tagging, automatically, the social media post of the first user with names of the one or more additional users that joined the first user and the one or more additional users that left the first user.

4. The computer implemented method of claim 3, further comprising:
posting, within the social media post of the first user, the tagged names of the one or more additional users that joined the first user and the one or more additional users that left the first user via a scroll bar.

5. The computer-implemented method of claim 4, wherein the scroll bar comprises point in time information of the one or more additional users that joined the first user and the one or more additional users that left the first user.

6. The computer-implemented method of claim 1, wherein the social media post of the first user comprises at least one of the following: an image, a photo, a video, a text posting, an event, and a location.

7. The computer-implemented method of claim 1, further comprising:
utilizing internet-of-things (IoT) proximity information and interactions between the computing device of the first user and the detected one or more additional computing devices of the one or more additional users to post, within the social media post of the first user, location and time references.

8. A computer program product for implementing a program that manages a device, comprising a non-transitory tangible storage device having program code embodied therewith, the program code executable by a processor of a computer to perform a method, the method comprising:
capturing a geographic location of a first computing device of a first user and a time stamp associated with a social media post of the first user;
posting the geographic location and the time stamp associated with the social media post of the first user;
detecting one or more additional computing devices of one or more additional users within a defined proximity of the first user; and
updating the social media post of the first user with one or more temporal aspects associated with the detected one or more additional computing devices of the one or more additional users.

9. The computer program product of claim 8, wherein the one or more temporal aspects comprise at least one of the following: the time stamp of when the one or more additional computing devices of the one or more additional users joined the first user; the time stamp of when the one or more additional computing devices of the one or more additional users left the first user; the geographic location of when the one or more additional computing devices of the one or more additional users joined the first user; and the geographic location of when the one or more additional computing devices of the one or more additional users left the first user.

10. The computer program product of claim 9, wherein updating the social media post of the first user with one or more temporal aspects associated with the detected one or more additional computing devices of the one or more additional users, comprises:
tagging, automatically, the social media post of the first user with names of the one or more additional users that joined the first user and the one or more additional users that left the first user.

11. The computer program product of claim 10, further comprising:
posting, within the social media post of the first user, the tagged names of the one or more additional users that joined the first user and the one or more additional users that left the first user via a scroll bar.

12. The computer program product of claim 11, wherein the scroll bar comprises point in time information of the one or more additional users that joined the first user and the one or more additional users that left the first user.

13. The computer program product of claim 8, wherein the social media post of the first user comprises at least one of the following: an image, a photo, a video, a text posting, an event, and a location.

14. The computer program product of claim 8, further comprising:
utilizing internet-of-things (IoT) proximity information and interactions between the computing device of the first user and the detected one or more additional computing devices of the one or more additional users to post, within the social media post of the first user, location and time references.

15. A computer system for implementing a program that manages a device, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
capturing a geographic location of a first computing device of a first user and a time stamp associated with a social media post of the first user;
posting the geographic location and the time stamp associated with the social media post of the first user;
detecting one or more additional computing devices of one or more additional users within a defined proximity of the first user; and updating the social media post of the first user with one or more temporal aspects associated with the detected one or more additional computing devices of the one or more additional users.

16. The computer system of claim 15, wherein the one or more temporal aspects comprise at least one of the following: the time stamp of when the one or more additional computing devices of the one or more additional users joined the first user; the time stamp of when the one or more additional computing devices of the one or more additional users left the first user; the geographic location of when the one or more additional computing devices of the one or more additional users joined the first user; and the geographic location of when the one or more additional computing devices of the one or more additional users left the first user.

17. The computer system of claim 16, wherein updating the social media post of the first user with one or more temporal aspects associated with the detected one or more additional computing devices of the one or more additional users, comprises:

tagging, automatically, the social media post of the first user with names of the one or more additional users that joined the first user and the one or more additional users that left the first user.

18. The computer system of claim 17, further comprising: posting, within the social media post of the first user, the tagged names of the one or more additional users that joined the first user and the one or more additional users that left the first user via a scroll bar.

19. The computer system of claim 18, wherein the scroll bar comprises point in time information of the one or more additional users that joined the first user and the one or more additional users that left the first user.

20. The computer system of claim 15, further comprising: utilizing internet-of-things (IoT) proximity information and interactions between the computing device of the first user and the detected one or more additional computing devices of the one or more additional users to post, within the social media post of the first user, location and time references.

* * * * *